May 26, 1959  C. KOOISTRA  2,888,304
SEAL CONSTRUCTION FOR ANTI-FRICTION BEARING
Filed Nov. 18, 1954
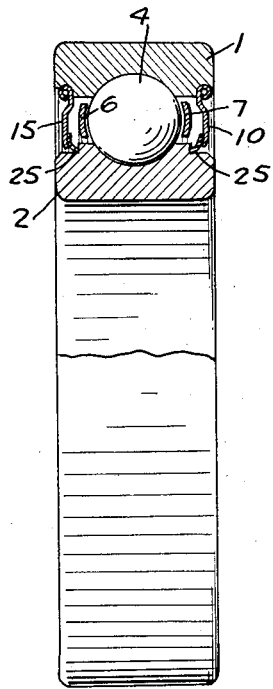
FIG. 1
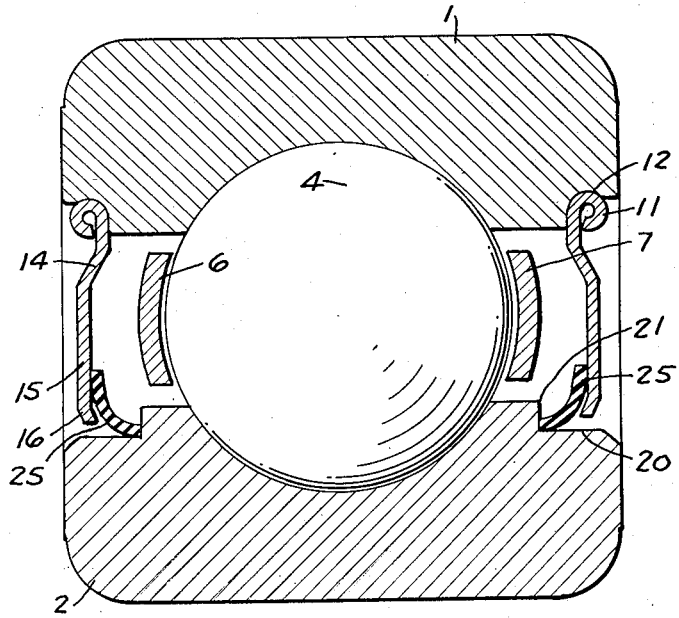
FIG. 2
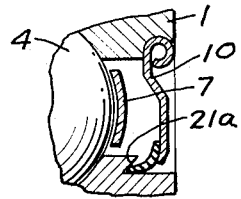
FIG. 5
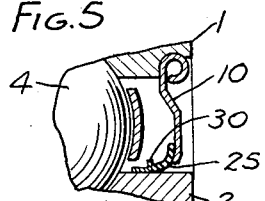
FIG. 6
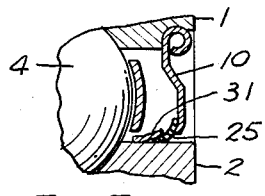
FIG. 7
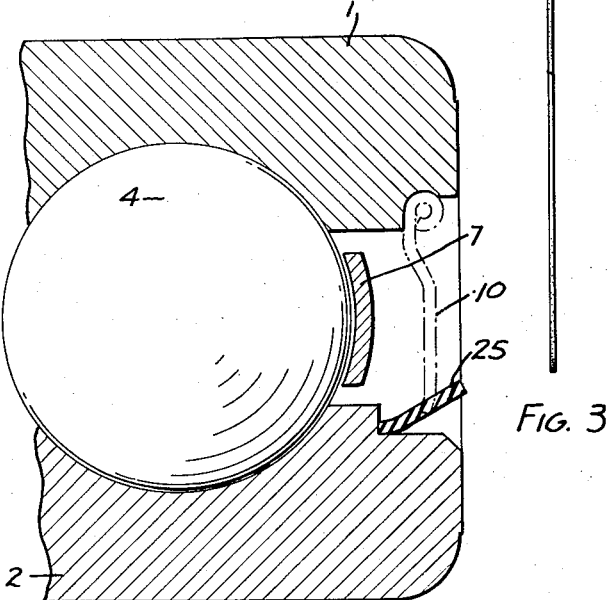
FIG. 3
FIG. 4
INVENTOR.
CLARENCE KOOISTRA
BY
ATTORNEYS.

United States Patent Office 2,888,304
Patented May 26, 1959

2,888,304

SEAL CONSTRUCTION FOR ANTI-FRICTION BEARING

Clarence Kooistra, Ann Arbor, Mich., assignor to Hoover Ball and Bearing Co., Ann Arbor, Mich., a corporation of Michigan Application November 18, 1954, Serial No. 469,718

1 Claim. (Cl. 308—187.2)

This invention relates to anti-friction bearings of the type employing outer and inner race members with rolling elements therebetween, and it has to do particularly with structure of a seal for enclosing the space between the races.

The objects of the invention, from a general standpoint, are, the provision of a seal basically simple in construction, a seal which will remain effective over a long period of time for enclosing the area occupied by the rolling elements thus to retain grease or lubricant and to exclude dirt and other extraneous matter from the outside, a seal where relatively movable elements associated with the two races are in actual contact with each other, and a seal wherein the contact is maintained by reason of the elasticity of one of the sealing members, and wherein the seal is of such construction that it is adequately lubricated, and the pressure of the contact is such as to prevent overheating and destruction in severe cases.

A bearing with a seal construction made in accordance with this invention is shown in the accompanying drawings:

Fig. 1 is a general view partly in cross section showing an anti-friction bearing with the seal structure of this invention.

Fig. 2 is an enlarged cross sectional view illustrating a bearing with a seal structure on each side of the rolling elements.

Fig. 3 is a sectional view of a seal member.

Fig. 4 is a view in cross section illustrating a condition before complete assembly.

Fig. 5 is a view illustrating a modified arrangement.

Fig. 6 is a sectional view illustrating a shoulder formed of a separate piece.

Fig. 7 is a view similar to Fig. 6 showing a further modification.

The anti-friction bearing shown herein has an outer race 1, and an inner race 2, these being circular in form as shown in Fig. 1, and each having a grooved raceway. Rolling elements operate in the raceways and as shown herein the rolling elements are in the form of balls 4. There is an annulus of balls in the raceways, and the annulus of balls may be held assembled by a suitable ball cage, opposite parts of which are shown at 6 and 7.

One member of the seal construction is in the form of an annular plate generally illustrated at 10 and preferably of metal. The outer peripheral edge is formed with a bead 11 seated in a groove 12 in the outer race 1. This is the outer sealing member. It may be suitably formed with in inclined part 14 and a main portion 15 which is preferably substantially truly radial. The inner peripheral edge may be flanged inwardly somewhat as at 16 and lies in proximity to and spaced from the inner race.

The inner race 2 is formed with a circumferential annular surface 20, the inner end of which terminates at and is defined by an annular shoulder 21. The annular shoulder 21 is advantageously radial and is spaced axially from the seal member 10.

The inner seal member is comprised of an elastic material, such as rubber, either natural or synthetic, or one of the so-called plastics. Preferably the material is one which will not be deleteriously affected by the lubricant or grease used with the bearing. The seal may be made of nylon or Teflon, or other plastics or resinous products. It may be made of a fabric, coated or impregnated with rubber, synthetic rubber, or plastic. The seal, on the other hand, may be a material such as a fabric re-inforced with plastic, natural or synthetic rubber.

The seal 25 shown herein may be considered as one formed entirely of a synthetic rubber or plastic and it is preferably formed or blanked out from a sheet of such material so that it is annular in form like a flat washer as shown in Fig. 3. The internal diameter of the washer is under size relative to the annular surface 20. The outside diameter of the washer is such that the washer will lie properly against the outer plate as will presently be seen.

In assembling the seal, the elastic washer is placed over the annular circumferential surface 20 and in order to do this, the material of the washer is stretched. This causes the washer to take a cupped or cone shape, as shown in Fig. 4. The inner peripheral edge is located by abutment against the shoulder 21, as shown in Fig. 2. The dimensions of the washer and the extent to which it is coned or cupped when in the position shown in Fig. 4, are such that the material of the washer projects beyond the plane of the outer member. With the inner seal member thus located, the outer seal member is then assembled with the outer race as by means of snapping or expanding the bead 11 into the groove 12. When the outer member is thus located, the inner washer is flexed as shown in Fig. 2 with the result that a part of the side surfaces of the inner member adjacent its outer periphery is in frictional engagement with the inside surface of the outer sealing member.

As shown in Fig. 2, a bearing may be equipped with two of such seals and thus the space between the races is enclosed to retain lubricant and to exclude extraneous dirt and other matter.

The pressure with which the flexible inner element engages the outer plate, may be regulated by the diameter and thickness and elasticity of the inner member. Because the outer plate member has its inner peripheral edge in close proximity to the inner race, the elastic member is protected during the time the bearing is handled, shipped and otherwise manipulated prior to assembly. A good sealing contact is had by reason of accurate forming and coining of the inner surface of the outer member, which in the best construction, is flat to eliminate waves or roughness therein.

In use, the inner race generally rotates relative to the outer race, which in many installations, may remain stationary, and the tightness of the engagement of the elastic washer with the inner race causes the washer to rotate with the inner race with a sliding engagement with the outer plate 10. The inner washer member serves somewhat as a lubricant slinger in that lubricant, during rotation, will flow along the inner surface of the elastic washer toward and to its outer diameter, this being at the location of the frictional engagement. As a result, the rubbing contact is supplied with lubricant. Moreover, as speed of rotation increases, the centrifugal force set up in the elastic washer reduces the pressure of the contact with the outer sealing member. This, in conjunction with the fact that the sealing contact is positioned to receive lubricant which travels ouwardly along the surface of the inner member, prevents over-heating due to the frictional engagement and prevents destruction of the seal which might otherwise occur in severe cases. Still further, the elasticity of the inner member compensates for wear. When the inner member is new it would normally take a position shown in Fig. 2 and when there is a slight wear, the inner member due to its elasticity straightens out somewhat to maintain the pressure contact.

Thus the seal is of the type which has a constant running contact between the two members. This contact is, of course, only slight as regards the overall loads and offers no interferences with the function of the bearing. Accordingly, the grease or lubricant is effectively maintained in the bearing and dirt and other extraneous materials are effectively excluded. Pressure which may develop within the bearing tends to tighten the engagement between the elements rather than tending to destroy the engagement.

The shoulder on the inner race may be formed in an angular formation, as shown at 21a in Fig. 5. This provides an undercut for receiving the edge of the seal member 25. Such a construction would aid to prevent the seal member from accidentally cupping in the wrong direction, particularly during assembly. The undercut serves to hold the inner edge radially inwardly.

The shoulder on the inner race 2 for the seal 25 may be formed by separate elements as shown in Figs. 6 and 7. In Fig. 6 a ring shaped metal stamping 30 may be pressed fitted on the inner race to form the shoulder. As shown in Fig. 6 the member 30 is of L-shape in cross section with the radial leg of the L serving as the shoulder. The ring shaped stamping may be of angular formation as shown at 31 in Fig. 7. The portion of the annular member 31 of smaller diameter may be tightly fitted upon or press fitted upon the inner race while its outer portion and edge are inclined to thus provide an undercut arrangement for the inner edge of the seal member.

In the claims appended hereto, the inner seal member is described as being of elastic material, such as rubber or plastic, and this expression not intended to be in the alternative, and is intended to cover variations where the seal member is composed partially of fabric or is reinforced by fabric. Also where it is specified in the claims that the inner race has a shoulder, such expression, where stated broadly, is intended to cover the shoulder against which the inner edge of the seal member abuts whether the shoulder is integral with the inner race or formed by separate elements such as are disclosed in Figs. 6 and 7.

I claim:

A seal structure in a bearing which has an outer race member, an inner race member, rolling elements between the race members, wherein the inner race member has, outwardly of the rolling elements, a circumferential surface substantially concentric with its axis and an outwardly facing shoulder extending outwardly from the circumferential surface, an outer seal member of annular form having its outer peripheral edge mounted on the outer race member and having its inner peripheral edge extending into close proximity to and spaced from the inner race member, an inner seal member of annular washer like form and normally substantially flat and comprised of elastic material, such as rubber or plastic, the normal interior diameter of the inner seal member being less than the diameter of the circumferential surface of the inner race member, the inner seal member being stretched and mounted over said circumferential surface with its inner peripheral edge abutted against said shoulder, the stretching of the inner seal member causing it to take a cupped shape so that it extends angularly outwardly from said shoulder, the dimension across the cupped inner seal member from its inner peripheral edge to its outer peripheral edge being greater than the distance between the shoulder on the inner race member and the inner surface of the outer seal member, whereby the inner seal member is held flexed and engaged between the shoulder on the inner race and the inner surface of the outer seal member and the yielding action incident to such flexing holding the outer peripheral portion of the inner seal member in engagement with the inner surface of the outer seal member, said outwardly facing shoulder being undercut and the inner peripheral edge of the inner seal member lying against and under the undercut form of the shoulder.

References Cited in the file of this patent

UNITED STATES PATENTS

| 2,144,691 | Schmal | Jan. 24, 1939 |
| 2,655,392 | Lighthall | Oct. 13, 1953 |
| 2,686,088 | Nelson | Aug. 10, 1954 |

FOREIGN PATENTS

| 978,288 | France | Nov. 22, 1950 |